June 10, 1958
R. KOLLGAARD
2,838,461
CATALYST REGENERATION
Filed Jan. 16, 1953
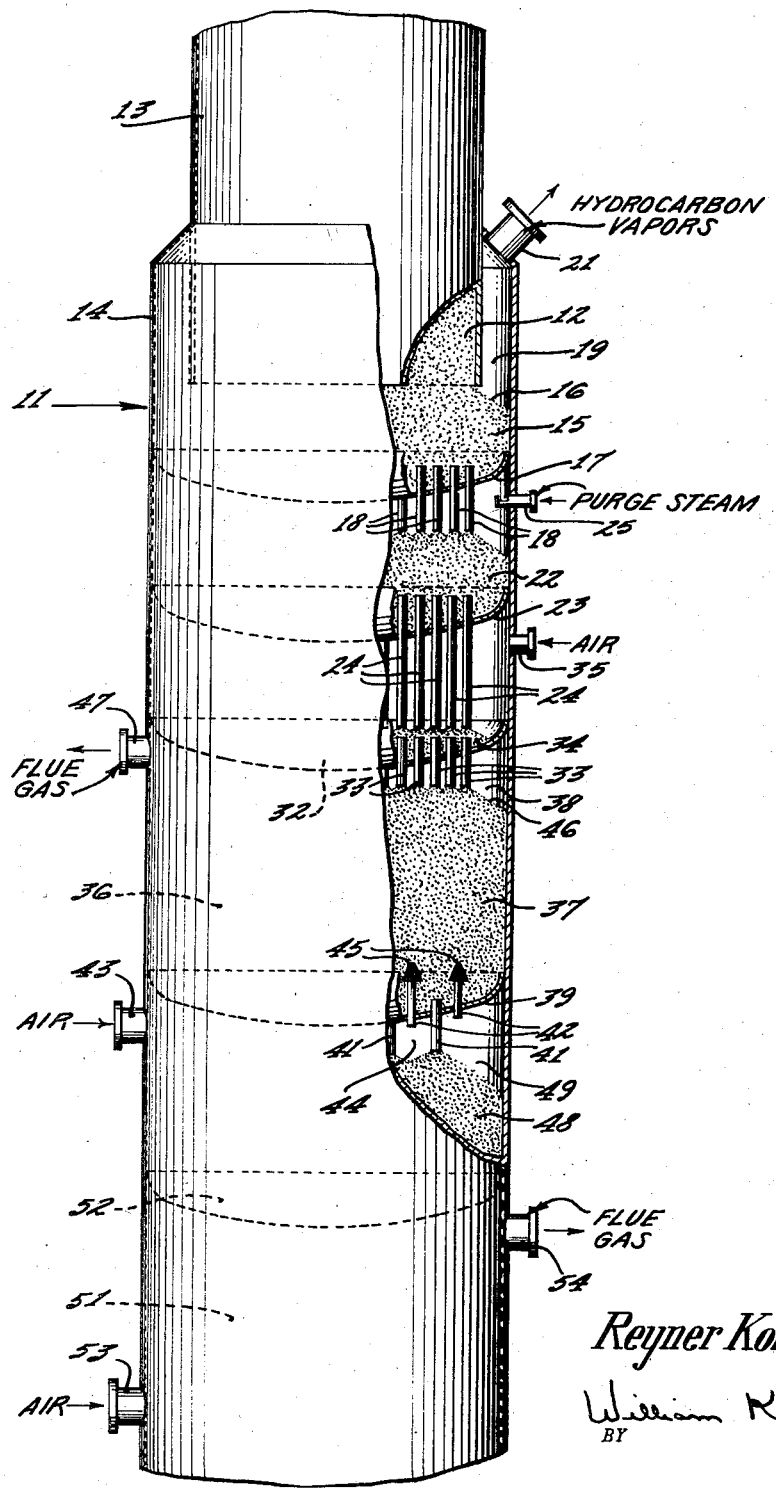
INVENTOR.
Reyner Kollgaard
BY William Klabunde
ATTORNEY

United States Patent Office 2,838,461
Patented June 10, 1958

2,838,461

CATALYST REGENERATION

Reyner Kollgaard, San Rafael, Calif., assignor to Houdry Process Corporation, Wilmington, Del., a corporation of Delaware Application January 16, 1953, Serial No. 331,544

4 Claims. (Cl. 252—418)

The present invention is directed to improvements in methods and apparatus for regenerating or reactivating granular contact material which has become contaminated with a carbonaceous deposit while serving as a catalytic contact mass in a hydrocarbon conversion system.

The particles of contact material referred to, such as catalyst in the form of beads or pellets comprising acid-activated clays or dried gels containing silica and alumina, are of the type commonly employed in compact moving bed systems and are between about 1–15, and preferably about 2–8, millimeters in diameter.

Processes for such catalytic conversion of hydrocarbons and periodic regeneration of the contact mass are well-known in the art, and are in extensive commercial use. Typical of such systems are those exemplified in the patents to J. W. Barker— 2,561,331, C. C. Peavey— 2,561,408, and R. Kollgaard—2,579,834.

In each of the disclosures of the above patentees the contact mass flows continuously through a circulatory system having a downflow path comprising a reactor arranged vertically above a regenerator comprising one or more regenerating zones, the contact material passing downwardly by gravity flow as a compact moving mass through the downflow path. It is to be understood, however, that the present invention is equally applicable to hydrocarbon conversion systems in which the contact mass is continuously circulated through and between a reactor and a regenerator which are not superimposed.

Regenerating systems of the type referred to herein employ a countercurrent flow of contact material and regenerating gas within the regenerating zone. Regenerators having multiple regeneration zones employing fully countercurrent flow of gas and contact material, and regenerators having multiple zones employing a combination of countercurrent and concurrent flow are in present commercial use. The latter type employ a split flow of regenerating gas, the gas being introduced at an intermediate level of the kiln or regenerator. A portion of the gas flows upwardly, countercurrent to the flow of contact material, and the remaining portion flows downwardly, countercurrent to the flow thereof. Regardless of the flow arrangement of the multiple zone regenerators heretofore employed, the practice has been to provide countercurrent flow of gas and contact material in the uppermost of the regenerating zones.

Whether the reactor is located directly over the regenerator, or whether it is located to one side thereof, countercurrent flow causes the spent or contaminated contact material entering the regenerator to be contacted initially by a gas stream having a low concentration of oxygen, inasmuch as the gas stream has already been passed upwardly through a portion of the catalyst bed, and has had its oxygen content reduced in supporting combustion of the carbonaceous deposit on the contact material.

Because of the low oxygen content of the gas in the uppermost region of the regenerator, and because of the relatively low temperature of the incoming catalyst, the regeneration rate in this region is relatively low. Consequently, the temperature of the contact mass is at a relatively low level. In certain cases, as where the contact material to be regenerated comprises hydrogel beads, combustion of the first 10% of the carbonaceous deposit may require from about 25–35% of the total kiln burning volume. Furthermore, because of the relatively-low burning capacity in the uppermost region of the kiln, residual oil which has not been previously purged from the contact material in the usual purging treatment following discharge from the reaction zone may be "distilled" from the contact material during the initial stages of regeneration and be carried with the flue gas into the stack. Such residual oil effects a slight discoloration of the flue gas, which is normally light blue, resulting in the formation of a yellow or orange cloud of smog, which may be objectionable. Since it is possible that local property damage may be attributed to the presence of such residual oil vapor in the stack discharge, the problem of smog is of serious nature to the industry.

It is a primary object of the present invention therefore to effect more complete combustion of the residual hydrocarbons retained on the contact material. To that end there is provided in accordance with the invention an initial burning zone ahead of the kiln, wherein the contact material and the regenerating gas flow concurrently while burning off the vaporizable material which otherwise would be carried to the stack as hydrocarbon vapors. The regenerating gas, such as air, may be preheated to a temperature in the range of 700–1000° F. in order to avoid a sudden quench of the contact material. There is thus initially, as a combination of temperature, oxygen concentration and carbon concentration, a relatively high regeneration rate, the result of which is to raise the temperature of the contact material rapidly. A substantial reduction in overall burning volume is thereby effected. Sufficient contact time is provided in the initial regenerating zone so that in the presence of the oxygen-rich regenerating gas there will be a substantially complete combustion of the residual oil, with consequent elimination of the problem of smog.

For a fuller understanding of the invention, reference may be had to the accompanying drawing forming a part of this application, in which the single figure of the drawing diagrammatically illustrates a fragmentary section of a combustion reactor-regenerator in which the reactor is superimposed above the regenerator, the entire combination being enclosed within a single elongated vessel of stepped cylindrical configuration.

For the purpose of illustrating and describing the invention it has not been considered necessary to disclose more than a fragmentary portion of the entire hydrocarbon conversion unit, such portion comprising the lower portion of the reaction zone, the intermediate disengaging and purging zones, and the upper two regenerating zones of a multi-stage regenerator. It will be understood that the complete hydrocarbon conversion system comprises also suitable means, such as a pneumatic lift, for maintaining a continuous circulation of the contact material.

Referring to the drawing, the unitary reactor-regenerator vessel is generally indicated by the numeral 11. The granular contact material flows downwardly as a compact moving bed through the reaction zone 12 within the narrow upper reactor portion 13 of the vessel 11. The reactor is open at its lower end, and extends within the upper end of the next lower stepped portion 14 of the cylindrical vessel. The contact material flows into the upper end of portion 14 as an expanded bed 15 having a peripheral exposed surface 16. Bed 15 is relatively shallow, and is supported upon transverse tube-sheet 17 containing purge nipples 18.

The hydrocarbons to be converted are introduced in known manner at the upper end of reactor 13 and pass downwardly through the gravitating mass of contact material forming the bed 12. Emerging from the lower end of the reactor, the gaseous conversion products are disengaged from the contact material forming bed 15 and escape at the peripheral surface 16 into the annular collecting space 19 formed between the lower end portion of reactor 13 and the upper end of cylindrical portion 14. The hydrocarbon vapors are withdrawn from annular collecting space 19 through outlet 21.

From the disengaging zone occupied by bed 15 the contact material is withdrawn through the purge nipples 18 and is deposited directly onto the surface of a relatively shallow compact moving bed 22 supported by transverse tube-sheet 23 containing elongated nipples or downcomers 24.

The lower ends of nipples 18 determine the surface level of the contact material in bed 22, the surfaces of the bed surrounding the discharge end of each nipple sloping away at the angle of repose for the particular granular material.

The space between the irregular surface of bed 22 and the underside of tube-sheet 17 forms a plenum into which purge gas, such as steam, is introduced through inlet 25. The major portion of the purge gas passes upwardly through the columns of contact material descending in purge nipples 18 and then through the bed 15 to the annular collecting space 19, thereby displacing the hydrocarbon vapors which were not disengaged in the upper region of the disengaging zone and passing therewith out of the vessel 11 through outlet 21.

While in the present illustrated embodiment of the invention the total disengagement of hydrocarbon vapors and purge gas is effected through the annular exposed surface of contact material 16, it is to be understood that any of the known disengaging devices may, if desired, be employed within the lowermost region of the reactor bed 12 to operate in conjunction with the peripheral disengagement from the surface of the expanded bed 15, and the internally disengaged vapors may be conveyed in known manner laterally into the collecting space 19.

From the bottom of bed 22 the contact material gravitates as a plurality of compact moving columns through elongated downcomers 24 and is deposited upon a tube-sheet 32 containing a plurality of short nipples 33 corresponding in number to downcomers 24 and individually aligned therewith. The remaining minor portion of the purge gas accompanies the contact material flowing downwardly through the downcomers 24.

The short nipples 33 have their upper ends spaced from the lower ends of the elongated downcomers 24 a relatively short distance, sufficient to permit the access of oxygen-containing gas, such as air, into the compact mass of contact material being transferred from downcomers 24 to nipples 33. While some of the contact material will settle around and between the upwardly projecting ends of nipples 33, it will for the most part constitute a stagnant or non-flowing mass 34. In other words, the contact material supported upon tube-sheet 32 is not a horizontally continuous compact moving bed, but rather a plurality of cones of solids movement diverging upwardly at the angle of solids flow from the upper ends of nipples 33 to the irregular surface of the compact mass, which diverges downwardly from the lower end of each downcomer 24 at the angle of repose of the contact material.

Air is supplied through inlet 35 to the space between tube-sheets 23 and 32 and it engages the contact material in the gaps between the aligned downcomers 24 and nipples 33. Combustion of hydrocarbon material accompanying the contaminated contact material occurs within the nipples 33, and the resultant gaseous combustion products are discharged with the contact material downwardly into the uppermost regenerating zone of the kiln, generally indicated by the numeral 36.

The contact material discharging from the lower end of nipples 33 is deposited directly onto the surface of a compact moving bed 37 whose upper surface is spaced from the tube-sheet 32 sufficiently to provide a gas collection space 38 therebetween. Bed 37 is of substantial depth and is supported by a tube-sheet 39 having contact material draw-off nipples 41 and air introduction nipples 42.

Air introduced through inlet 43 into a manifold space 44 directly underneath tube-sheet 39 enters the lower region of bed 37 through air distribution devices 45 of known design on the upper ends of nipples 42, and passes countercurrently upward through the bed. The gaseous products of regeneration formed within the bed 37 are disengaged therefrom at its exposed upper surface 46. The gas accompanying the contact material flowing downwardly through nipples 33 is also disengaged at surface 46, and the total disengaged gas is removed from space 38 through flue gas outlet 47.

The contact material discharging from nipples 41 is deposited directly onto a compact moving bed 48, the exposed surface 49 of which forms the lowermost boundary of the air manifold space 44. Bed 48 comprises a cooling section between successive countercurrent flow kiln sections 36 and 51. In known manner, the bed 48 may be provided with conventional cooling coils, not shown. A tube-sheet 52, having nipples similar to nipples 33 in tube-sheet 32, separates the cooling section from the next lower kiln section 51. Air is introduced at the bottom of kiln section 51 through inlet 53, and flue gas is removed at the top thereof through outlet 54. If desired, the contact material may be passed through one or more additional kiln sections before being removed in known manner from the bottom of vessel 11. Such additional regeneration zones may be of countercurrent flow type or may be of split-flow type, known to the art, wherein there is provided a countercurrent flow section above a level of air introduction and a concurrent flow section below such level.

The invention may be applied in the redesign and modification of existing multi-zone kilns in which the uppermost burning zone is arranged for countercurrent flow, or it may be applied to a single countercurrent-flow kiln. In any case, the residence time in the nipples 33 should be sufficient to effect the desired combustion of the material which would otherwise be carried out of the stack in the form of smog.

In a typical operation in accordance with the invention, the hydrocarbons may be converted within reactor bed 12 under average temperature conditions in the range of about 875–900° F. Due to endothermic heat of reaction the temperature of the effluent hydrocarbon stream and the contact material will be lowered to about 855–880° F. As a result of purge steam quenching and system heat loss the contaminated contact material is discharged from the elongated conduits 24 directly into the cones of solids movement above the upper ends of nipples 33 at or slightly lower temperature, in the range of 840–870° F. Air, preheated to a temperature of about 700–1000° F. in order to avoid quenching, is introduced into the solids-free space above the shallow mass of contact material 34 through inlet 35. Because of the 20% oxygen content of the air, there is a relatively-high regeneration rate in the initial burning stage, that is, while the contact material is descending through the nipples 33.

Obviously many modifications and variations of the invention as hereinbefore set forth may be made without departing from the spirit and scope thereof, and therefore only such limitations should be imposed as are indicated in the appended claims.

What is claimed is:

1. In a hydrocarbon conversion process wherein granular contact material contaminated with a carbonaceous deposit is regenerated by combustion of such deposit in the presence of oxygen-containing gas while gravitating as a compact moving mass through a regenerator, the improvement which comprises the steps of: introducing said contact material as a first plurality of confined compact moving columns into an initial contact zone, introducing oxygen-containing gas into said initial contact zone, withdrawing said contact material in admixture with said oxygen-containing gas from said initial contact zone as a second plurality of confined compact moving columns individually aligned with said first plurality and closely spaced therefrom, said second plurality of columns comprising initial concurrent-flow regeneration zones, discharging said contact material and the gaseous combustion products from said second plurality of columns within an expanded confined regeneration zone, said contact material being deposited directly onto the surface of a compact moving bed therein, introducing oxygen-containing gas into the lower region of said bed and passing the same countercurrently therethrough, disengaging the total gaseous combustion products formed within said columns and said bed at the exposed surface of said bed, discharging said total disengaged gaseous combustion products from the space above said bed, and discharging said contact material downwardly in compact flow from the lower end of said bed.

2. The method as defined in claim 1 including the step of passing said contact material discharged from said bed successively through at least one additional regeneration zone located beneath said expanded regeneration zone.

3. A method of regenerating hot, spent granular contact material bearing a deposit of carbonaceous material and vaporizable residual hydrocarbons which comprises the steps of: introducing said contact material as a plurality of elongated, confined compact moving streams downwardly into an initial contact zone wherein said streams combine to form a shallow bed of contact material; discharging contact material from said shallow bed as a plurality of short confined compact moving streams individual to and axially below said elongated streams; introducing said short confined streams of contact material into a regenerating zone wherein said short streams combine to form a deep compact moving bed of contact material; discharging contact material from the bottom of said regenerating zone; introducing oxygen-containing gas into said initial contact zone for concurrent downward flow through said shallow bed and said short streams of contact material to said regenerating zone; introducing additional oxygen-containing gas at the lower end of said regenerating zone for countercurrent upward flow through said deep bed; disengaging gaseous material from the surface of said deep bed of contact material and collecting the same at the upper end of said regenerating zone, said disengaged gaseous material comprising both the concurrently flowing gaseous effluent resulting from the combustion of said vaporizable residual hydrocarbons within said initial contact zone and the countercurrently flowing gaseous effluent resulting from the combustion of said carbonaceous material within said regeneration zone; and discharging the total gaseous effluent from said upper end of said regenerating zone. The conditions of temperature, contact material residence time and oxygen concentrations within said initial contact zone and within said short confined streams being such as to remove said residual hydrocarbons substantially entirely by combustion, without appreciable distillation thereof, so that the total resulting gaseous effluent is substantially free of visually detectable vaporized hydrocarbons.

4. A regenerator for a catalytic hydrocarbon conversion system comprising an upright cylindrical vessel; a tube-sheet extending across said vessel at an upper level therein and adapted to support therein a first compact moving bed of spent granular contact material; a second tube-sheet spaced below said first tube-sheet to form within said vessel a first chamber for effecting contact between said granular material and oxygen-containing gas; equal pluralities of vertical tubes set in each of said first and second tube-sheets to convoy said granular material by gravity flow into and out of said first chamber, the opposed ends of said pluralities of tubes being in vertical alignment and spaced within the bottom region of said first chamber so as to provide a relatively-shallow second bed of granular material therebetween, such that the entire cone of solids flow between each pair of aligned tubes is surrounded by relatively stagnant granular material; a third tube-sheet extending across said vessel at a level spaced below said second tube-sheet so as to form within said vessel a second contact chamber adapted to contain a third compact moving bed of said granular material of substantially greater depth than the depth of said relatively-shallow bed within said first contact chamber; a plurality of tubes in said third tube-sheet adapted to discharge said granular material from said second contact chamber; separate means for introducing oxygen-containing gas into both the upper region of said first contact chamber above the surface level of said second bed and at the bottom of said second contact chamber within the lower region of said third bed; and means for withdrawing the gaseous products of regeneration at the top of said second contact chamber above the surface of said third bed.

References Cited in the file of this patent

UNITED STATES PATENTS

| | | |
|---|---|---|
| 2,465,255 | Moorman | Mar. 22, 1949 |
| 2,636,805 | Lassiat et al. | Apr. 28, 1953 |
| 2,647,859 | Barker | Aug. 4, 1953 |